(12) United States Patent
Wang et al.

(10) Patent No.: US 11,116,058 B2
(45) Date of Patent: Sep. 7, 2021

(54) LED DIMMING CONTROL CIRCUIT, DIMMING CONTROL METHOD AND LED POWER SYSTEM THEREOF

(71) Applicant: Silergy Semiconductor Technology (Hangzhou) LTD, Hangzhou (CN)

(72) Inventors: Longqi Wang, Hangzhou (CN); Qi'an Zeng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/699,861

(22) Filed: Dec. 2, 2019

(65) Prior Publication Data

US 2020/0187326 A1 Jun. 11, 2020

(30) Foreign Application Priority Data

Dec. 6, 2018 (CN) .......................... 201811484384.3

(51) Int. Cl.
*H05B 45/325* (2020.01)
*H05B 45/10* (2020.01)

(52) U.S. Cl.
CPC .......... *H05B 45/325* (2020.01); *H05B 45/10* (2020.01)

(58) Field of Classification Search
CPC ............................. H05B 45/325; H05B 45/10
See application file for complete search history.

(56) References Cited

U.S. PATENT DOCUMENTS

| | | | |
|---|---|---|---|
| 6,075,716 A | 6/2000 | He et al. | |
| 6,385,057 B1 | 5/2002 | Barron | |
| 8,471,488 B1 | 6/2013 | Hopkins et al. | |
| 9,077,260 B2 | 7/2015 | Zhao et al. | |
| 9,124,169 B2 | 9/2015 | Garlow et al. | |
| 9,282,606 B1* | 3/2016 | Kuang | H05B 45/10 |
| 9,525,336 B2 | 12/2016 | Huang | |
| 2007/0182699 A1* | 8/2007 | Ha | G09G 3/3413 345/102 |
| 2009/0243398 A1 | 10/2009 | Yohanan et al. | |
| 2011/0140620 A1* | 6/2011 | Lin | H05B 45/3725 315/224 |
| 2015/0207398 A1 | 7/2015 | Proca | |
| 2015/0216007 A1 | 7/2015 | Ferrara et al. | |
| 2017/0094738 A1* | 3/2017 | Garner | H05B 39/04 |
| 2019/0182921 A1* | 6/2019 | Li | H05B 45/10 |
| 2019/0335556 A1* | 10/2019 | Li | H05B 45/10 |

* cited by examiner

*Primary Examiner* — Raymond R Chai
(74) *Attorney, Agent, or Firm* — Michael C. Stephens, Jr.

(57) ABSTRACT

An LED dimming control circuit can include: a detection circuit configured to receive a dimming control signal, and to generate a detection signal for characterizing a type of the dimming control signal; and a dimming signal generation circuit configured to generate a dimming signal according to the detection signal and the dimming control signal, where a duty cycle of the dimming signal corresponds to the dimming control signal. A dimming control method can include: receiving a dimming control signal; detecting a number of rising or falling edges of the dimming control signal within a period of time to generate a detection signal; and determining a type of the dimming control signal in accordance with the detection signal.

19 Claims, 5 Drawing Sheets

LED DIMMING CONTROL CIRCUIT, DIMMING CONTROL METHOD AND LED POWER SYSTEM THEREOF

RELATED APPLICATIONS

This application claims the benefit of Chinese Patent Application No. 201811484384.3, filed on Dec. 6, 2018, which is incorporated herein by reference in its entirety.

FIELD OF THE INVENTION

The present invention generally relates to the field of power electronics, and more particularly to light-emitting diode (LED) dimming control circuits and power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Example dimming methods of light-emitting diode (LED) dimming control circuits can include analog dimming of 0-10V (i.e., from about 0V to about 10V), resistance dimming, and pulse-width modulation (PWM) dimming. Due to different types of dimmers, different signal generation methods and different types of dimming signals are generated, the dimming control circuits can be designed to match the different types of dimmers. Many dimming control circuits may not be compatible with these dimming modes, and dimming compatibility can be poor as a result. In analog dimming of, e.g., from about 0V to about 10V, a comparator can be used to convert the 0-10V signal into a PWM signal, and then to pass it to the LED dimming control circuit. The PWM dimming mode can directly transfer the PWM dimming signal to the LED dimming control circuit. Therefore, the dimming control circuit may be required to be compatible with both types of dimming signals.

In one embodiment, an LED dimming control circuit can include: (i) a detection circuit configured to receive a dimming control signal, and to generate a detection signal for characterizing a type of the dimming control signal; and (ii) a dimming signal generation circuit configured to generate a dimming signal according to the detection signal and the dimming control signal, where a duty cycle of the dimming signal corresponds to the dimming control signal. In one embodiment, a dimming control method can include: (i) receiving a dimming control signal; (ii) detecting a number of rising or falling edges of the dimming control signal within a period of time to generate a detection signal; and (iii) determining a type of the dimming control signal in accordance with the detection signal.

Figure 1:
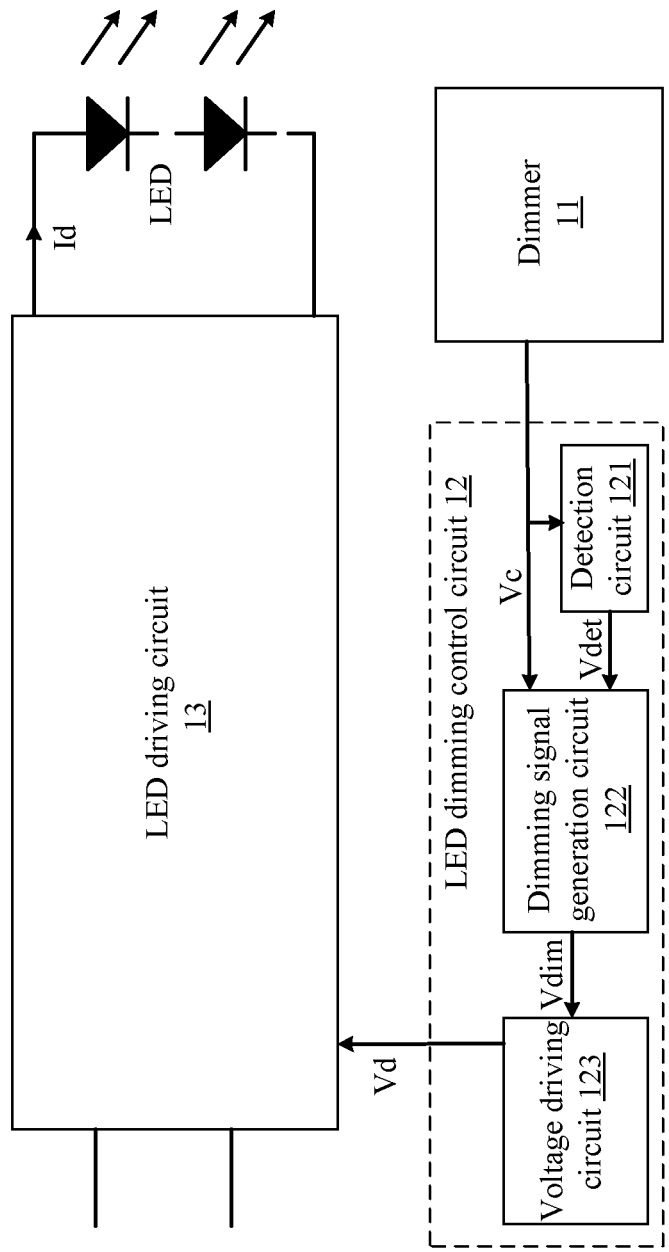
FIG. 1 is a schematic block diagram of a first example LED dimming control circuit, in accordance with embodiments of the present invention.

Referring now to FIG. 1, shown is a schematic block diagram of a first example LED dimming control circuit, in accordance with embodiments of the present invention. This particular example LED dimming control circuit can be applied to an LED power system, and the LED power system can include dimmer 11, LED dimming control circuit 12, LED driving circuit 13, and an LED load. Dimmer 11 can generate dimming control signal Vc, and LED dimming control circuit 12 can receive dimming control signal Vc and convert it into voltage driving signal Vd. Further, LED driving circuit 13 can generate driving current Id according to voltage driving signal Vd correspondingly, in order to drive the LED load to emit light with brightness corresponding to dimming control signal Vc.

In this example, LED dimming control circuit 12 can include detection circuit 121, dimming signal generation circuit 122, and voltage driving circuit 123. Detection circuit 121 can receive dimming control signal Vc generated by dimmer 11, automatically detect the type of dimming control signal Vc therein, and generate detection signal Vdet correspondingly. Dimming signal generation circuit 122 can select a corresponding conversion circuit, in order to convert dimming control signal Vc into dimming signal Vdim according to detection signal Vdet. Voltage driving circuit 123 can generate voltage driving signal Vd in accordance with dimming signal Vdim generated by dimming signal generation circuit 122 correspondingly. In addition, LED driving circuit 13 can generate driving current Id according to voltage driving signal Vd correspondingly, in order to drive the LED load to emit light with brightness corresponding to dimming control signal Vc.

Figure 2:
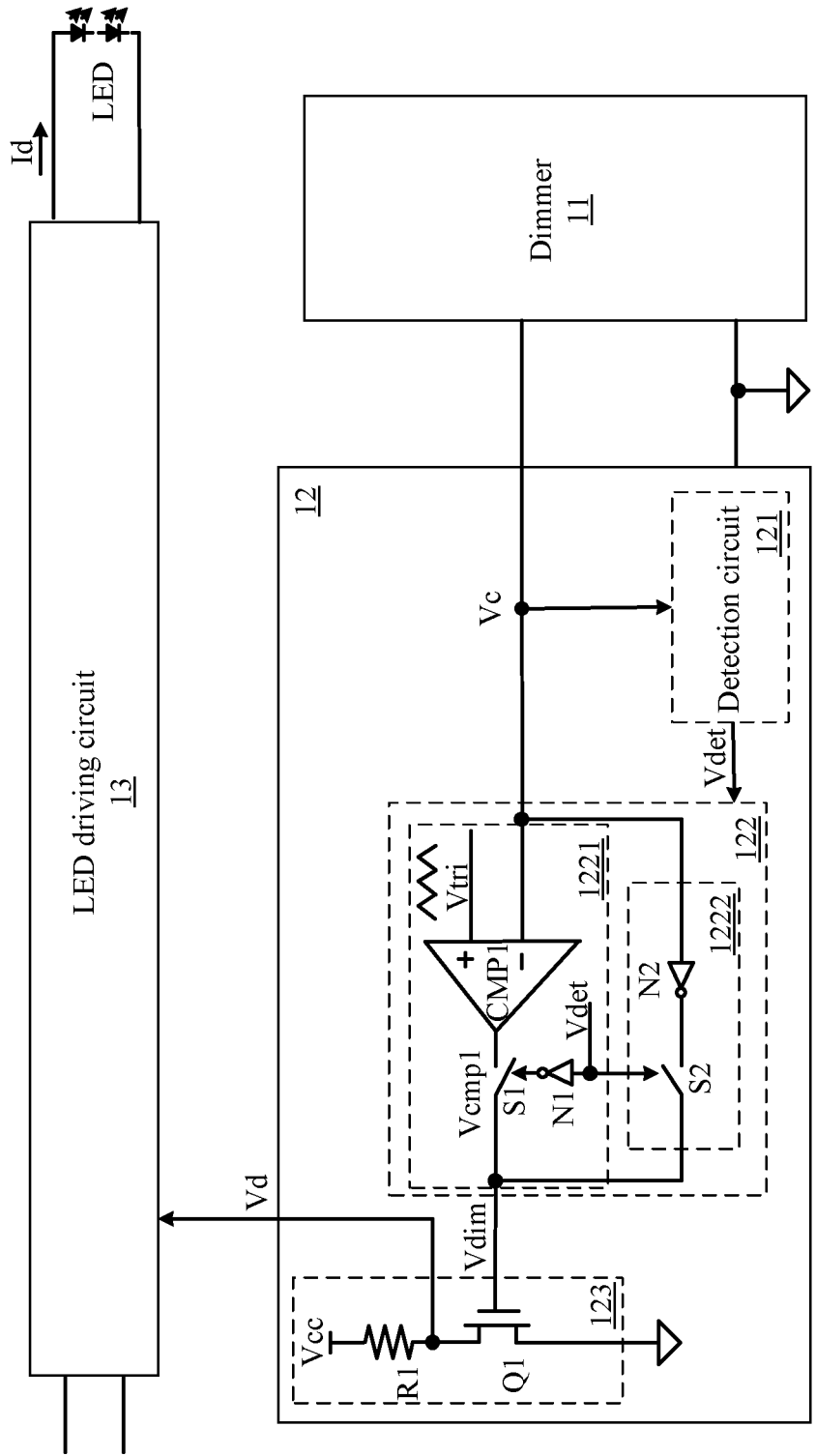
FIG. 2 is a schematic block diagram of a second example LED dimming control circuit, in accordance with embodiments of the present invention.

Referring now to FIG. 2, shown is a schematic block diagram of a second example LED dimming control circuit, in accordance with embodiments of the present invention. In this particular example, dimmer 11 connected to LED dimming control circuit 12 can provide dimming control signal Vc with the type of either a certain voltage signal determined by dimmer 11 or a PWM signal to LED dimming control circuit 12. Since the mechanism for converting the two types of the dimming control signals into the dimming signal is different, LED dimming control circuit 12 can automatically detect the two types of dimming control signals, so as to be converted into dimming signals by different conversion circuits, respectively.

Figure 3:
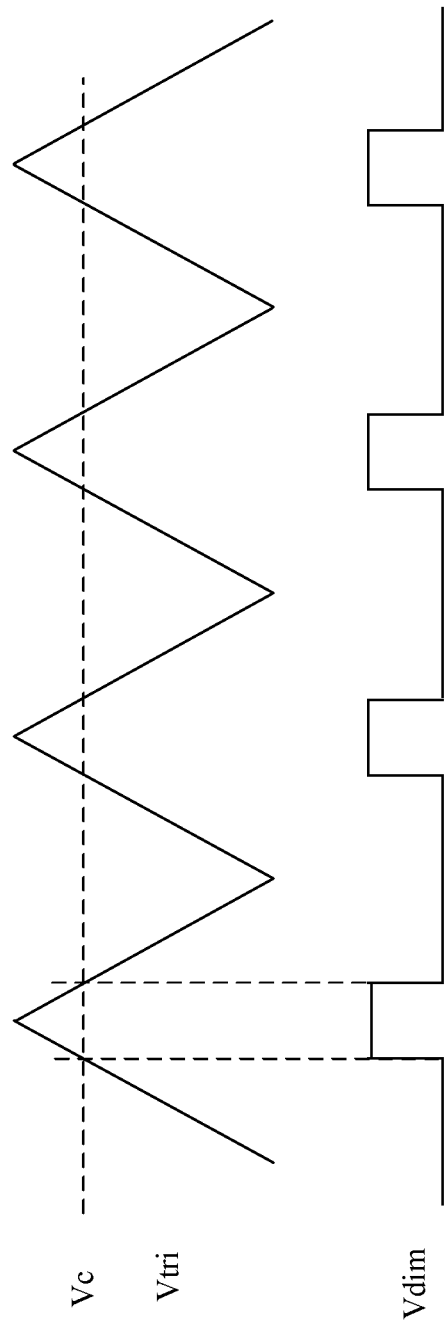
FIG. 3 is a waveform diagram of example operation of the LED dimming control circuit, in accordance with embodiments of the present invention.

Referring now to FIG. 3, shown is a waveform diagram of example operation of the LED dimming control circuit, in accordance with embodiments of the present invention. In this particular example, when dimming control signal Vc is of the certain voltage signal, detection signal Vdet may be in a first state (e.g., at a low level) such that LED dimming control circuit 12 can directly compare dimming control signal Vc against triangular wave signal Vtri to generate dimming signal Vdim. When dimming control signal Vc is of the PWM signal, detection signal Vdet may be in a second state (e.g., at a high level) such that dimming control signal Vc can be directly taken or inverted as dimming signal Vdim. In addition, detection circuit 121 can identify the type of dimming control signal Vc by detecting the number of rising or falling edges of dimming control signal Vc for a period of time.

In particular embodiments, since the dimming control signal with the certain voltage signal may have no rising edge or falling edge for a period of time, and the dimming control signal with the PWM signal may have a plurality of rising edges or falling edges for a period of time, the type of the dimming control signal can be distinguished accordingly. Further, when the number of rising edges or falling edges of dimming control signal Vc is less than a predetermined number, dimming control signal Vc may be characterized as the certain voltage signal, and detection signal Vdet can be in the first state. When the number of rising edges or falling edges of dimming control signal Vc is greater than the predetermined number, dimming control signal Vc may be characterized as the PWM signal, and detection signal Vdet can be in the second state. In one particular example, the number of rising edges may be greater than three.

Referring back to FIG. 2, dimming signal generation circuit 122 can include conversion circuits 1221 and 1222. Conversion circuits 1221 and 1222 can respectively be enabled when detection signal Vdet is in the first state and detection signal Vdet is in the second state. Conversion circuit 1221 can receive dimming control signal Vc with the type of the certain voltage signal, and compare dimming control signal Vc against triangular wave signal Vtri to obtain comparison result Vcmp1. In this case, comparison result Vcmp1 may be taken as dimming signal Vdim. For example, conversion circuit 1221 can include comparator CMP1, inverter N1, and switch S1. The non-inverting and inverting input terminals of comparator CMP1 can respectively receive triangular wave signal Vtri and dimming control signal Vc, and the output terminal of comparator CMP1 can generate comparison result Vcmp1. The on and off states of switch S1 can be controlled by detection signal Vdet through inverter N1. When detection signal Vdet is in the first state (e.g., at the low level), switch S1 may be turned on, and comparison result Vcmp1 can be generated to be dimming signal Vdim.

Conversion circuit 1222 can receive dimming control signal Vc with the type of the PWM signal, and invert dimming control signal Vc to be dimming signal Vdim. For example, conversion circuit 1222 can include inverter N2 and switch S2. The on and off states of switch S2 can be controlled by detection signal Vdet. When detection signal Vdet is in the second state (e.g., at the high level), switch S2 can be turned on, and the inverted version of dimming control signal Vc may be taken as dimming signal Vdim.

In this example, voltage driving circuit 123 can receive dimming signal Vdim generated by dimming signal generation circuit 122, and may generate voltage driving signal Vd correspondingly. For example, voltage driving circuit 123 can include transistor Q1 and resistor R1. Transistor Q1 can connect in series with resistor R1 between supply voltage Vcc and ground. One terminal of transistor Q1 may be grounded. The other terminal of transistor Q1 can connect to one terminal of resistor R1, and the other terminal of resistor R1 can receive supply voltage Vcc. Voltage driving signal Vd can be generated at the common node of transistor Q1 and resistor R1. In addition, transistor Q1 can be controlled to be turned on and off by dimming signal Vdim.

When dimming signal Vdim is at a high level, transistor Q1 can be turned on. In this case, voltage driving signal Vd may be pulled down to zero. When dimming signal Vdim is at a low level, transistor Q1 can be turned off, and voltage driving signal Vd may be pulled to supply voltage Vcc. Therefore, the duty cycle of dimming signal Vdim can be complementary to the duty cycle of voltage driving signal Vd, and voltage driving signal Vd may have the same magnitude as supply voltage Vcc, thereby satisfying the demand of the LED driving circuit. It can be understood that in different circuit configurations, the duty cycle of dimming signal Vdim and the duty cycle of voltage driving signal Vd may be the same or in other relationships, as long as voltage driving signal Vd can characterize dimming control signal Vc.

Figure 4:
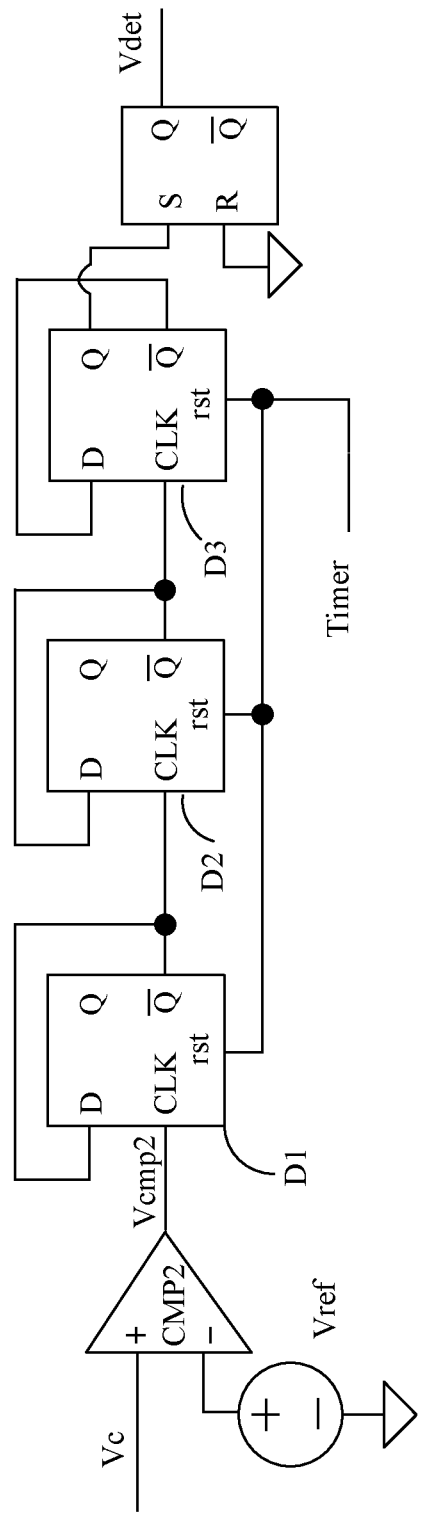
FIG. 4 is a schematic block diagram of an example detection circuit, in accordance with embodiments of the present invention.

Referring now to FIG. 4, shown is a schematic block diagram of an example detection circuit, in accordance with embodiments of the present invention. In this particular example, detection circuit 121 can include comparator CMP2, D flip-flops D1, D2, and D3, and an RS flip-flop. For example, the non-inverting and inverting input terminals of comparator CMP2 can respectively receive dimming control signal Vc and reference voltage Vref, and the output terminal of comparator CMP2 can generate comparison signal Vcmp2. Terminals D of the three D flip-flops can connect to the output terminals $\overline{Q}$ thereof. Clock terminal CLK of D flip-flop D1 can connect to comparator CMP2, and may receive comparison signal Vcmp2. Output terminal $\overline{Q}$ of D flip-flop D1 can connect to clock terminal CLK of D flip-flop D2, and output terminal $\overline{Q}$ of D flip-flop D2 can connect to clock terminal CLK of D flip-flop D3. Reset terminals rst of the three D flip-flops can receive the same timing signal Timer, and timing signal Timer can represent the period of time for detecting the number of rising edges or falling edges of dimming control signal Vc. Set terminal S of the RS flip-flop can connect to output terminal Q of D flip-flop D3, reset terminal R of the RS flip-flop can connect to the ground, and output terminal Q of the RS flip-flop may generate detection signal Vdet.

For example, detection circuit 121 can detect the number of the rising edges of dimming control signal Vc within a period of time. For example, when the number of the rising edges of dimming control signal Vc is greater than three, detection signal Vdet can be at a high level. When the number of the rising edges of dimming control signal Vc is less than three, detection signal Vdet is at a low level. When dimming control signal Vc is of the certain voltage signal, the counter formed by three D flip-flops may not obtain a valid count value. That is, D flip-flop D3 may not generate a valid output signal at output terminal Q, and set terminal S of the RS flip-flop may not be set, such that the RS flip-flop may generate detection signal Vdet with a low level. When dimming control signal Vc is of the PWM signal, the counter can generate a valid count value when the number of the rising edges of dimming control signal Vc is greater than three within a period of time. That is, D flip-flop D3 can generate a valid output signal at output terminal Q, and set terminal S of the RS flip-flop may be set, such that the RS flip-flop may generate detection signal Vdet with a high level.

In order to improve the efficiency of the circuit system, detection circuit 121 may only operate for a period of time after receiving dimming control signal Vc, and can complete the detection of the type of dimming control signal Vc during this period of time. When the normal operation is completed, detection circuit 121 can be disabled.

It should be noted that when dimming control signal Vc is of the certain voltage signal, dimmer 11 that generates dimming control signal Vc may operate in the resistance dimming mode or the analog dimming mode. The operating mechanism of the resistance dimming mode and the 0-10V analog dimming mode can be different. The resistance dimming mode is based on Ohm's law, and the output signal of the dimmer can be changed by changing the resistance value. Also, the dimmer for 0-10V analog dimming may mostly be formed by transistors. By adjusting the current flowing through the transistors, the output signal of the dimmer can be adjusted. Although the operating mechanism of the two dimming mode is different, in each case external current may need to be supplied for both dimmers, and the output signals of the two dimmers can be the voltage of 0-10V representing the brightness. In such examples, regardless of the type of dimmer, as long as the output signal of the dimmer is of the certain voltage signal or the PWM signal, it can be recognized. In this way, the LED dimming control circuit of particular embodiments can recognize almost all dimmers due to its independence from how the dimmer itself generates these output signals.

Figure 5:
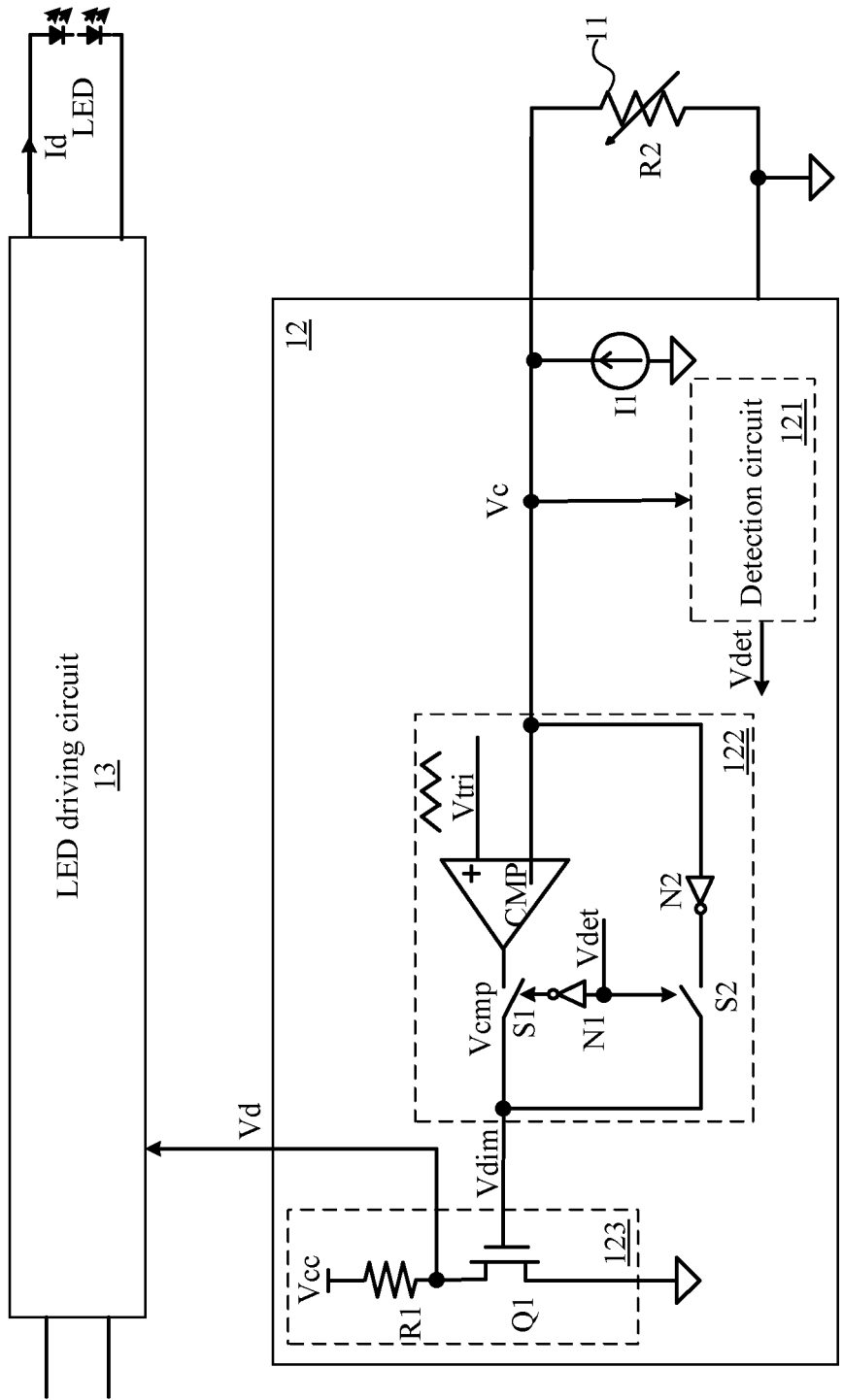
FIG. 5 is a schematic block diagram of a third example LED dimming control circuit, in accordance with embodiments of the present invention.

Referring to FIG. 5, shown is a schematic block diagram of a third example LED dimming control circuit, in accordance with embodiments of the present invention. In this particular example, LED dimming control circuit 12 can include dimmer 11, LED dimming control circuit 12, and LED driving circuit 13, as discussed above. In addition, LED dimming control circuit 12 can also include current source I1 connected in parallel with the LED dimming control circuit for matching a passive dimmer. In operation of the resistance dimming mode, since the resistor is a passive device, if there is no internal current source, no voltage can be generated at the input terminal of LED dimming control circuit 12, and dimmer 11 may not be used normally. In the same way, in the application of the 0-10V analog passive dimmer, since the dimmer itself may not generate 0-10V voltage, it may need to provide a certain current externally for excitation in order to operate normally. Since the input terminal of LED dimming control circuit 12 can supply the certain current for the dimmer, the exemplified LED dimming control circuit can be compatible with a variety of dimmers.

In particular embodiments, the LED dimming control circuit can automatically convert the type of the dimming control signal generated by the dimmer, and may adaptively select the corresponding conversion circuit to convert the dimming control signal into a dimming signal. In this way, the LED dimming control circuit is compatible with various types of dimmers, and the associated control method is relatively simple.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light-emitting diode (LED) dimming control circuit, comprising:
   a) a detection circuit configured to receive a dimming control signal, and to generate a detection signal for characterizing a type of the dimming control signal by detecting a number of rising or falling edges of the dimming control signal within a period of time by counting transitions of a clock signal that is generated by comparing the diming control signal against a reference voltage;
   b) a dimming signal generation circuit configured to generate a dimming signal according to the detection signal and the dimming control signal, wherein a duty cycle of the dimming signal corresponds to the dimming control signal; and
   c) a first conversion circuit configured to compare the dimming control signal against a triangular wave signal to generate a comparison result that is high when the triangular wave signal is greater than the dimming control signal.

2. The LED dimming control circuit of claim 1, wherein:
   a) when the number of rising or falling edges of the dimming control signal is less than a predetermined number, the dimming control signal is of a certain voltage signal, and the detection signal is in a first state; and
   b) when the number of rising or falling edges of the dimming control signal is not less than the predetermined number, the dimming control signal is of a pulse-width modulation (PWM) signal, and the detection signal is in a second state.

3. The LED dimming control circuit of claim 2, wherein when the dimming control signal is of the certain voltage signal, a dimmer for generating the dimming control signal operates in a resistance dimming mode or an analog dimming mode.

4. The LED dimming control circuit of claim 1, wherein the detection circuit only operates for the period of time after receiving the dimming control signal and is then disabled.

5. The LED dimming control circuit of claim 1, wherein the dimming signal generation circuit comprises:
   a) the first conversion circuit being enabled when the detection signal is in a first state; and
   b) a second conversion circuit that is enabled when the detection signal is in a second state.

6. The LED dimming control circuit of claim 5, wherein the second conversion circuit is configured to receive the dimming control signal with the type of a PWM signal, and to directly take or invert the dimming control signal as the dimming signal.

7. The LED dimming control circuit of claim 5, further comprising a voltage driving circuit having a first transistor and a first resistor coupled in series between a supply voltage and ground, and being configured to generate a voltage driving signal for generating a driving current to drive an LED load at a common node between the first transistor and the first resistor according to the dimming signal.

8. The LED dimming control circuit of claim 7, wherein a duty cycle of the dimming signal is complementary to or the same as a duty cycle of the voltage driving signal.

9. The LED dimming control circuit of claim 1, wherein the comparison result is directly taken as the dimming signal when the detection signal is in a first state.

10. The LED dimming control circuit of claim 1, further comprising a current source coupled in parallel with an input terminal of the LED dimming control circuit to provide current for matching a passive dimmer, wherein the current source is in parallel with the passive dimmer.

11. The LED dimming control circuit of claim 1, wherein the dimming signal generation circuit is configured to convert the dimming control signal to the dimming signal by a different conversion in accordance with the detection signal.

12. The LED dimming control circuit of claim 11, wherein when the dimming control signal is of a certain voltage signal, the duty cycle of the dimming signal corresponds to an amplitude of the dimming control signal.

13. The LED dimming control circuit of claim 11, wherein when the dimming control signal is of a PWM signal, the duty cycle of the dimming signal corresponds to a duty cycle of the dimming control signal.

14. An LED power system, comprising the LED dimming control circuit of claim 1, and further comprising:
a) a dimmer configured to generate the dimming control signal;
b) wherein the LED dimming control circuit is configured to generate a voltage driving signal according to the dimming control signal; and
c) an LED driving circuit configured to generate a driving current to drive an LED load according to the voltage driving signal.

15. A dimming control method for a light-emitting diode (LED), the method comprising:
a) receiving a dimming control signal;
b) detecting a number of rising or falling edges of the dimming control signal within a period of time to generate a detection signal by counting transitions of a clock signal that is generated by comparing the diming control signal against a reference voltage;
c) determining a type of the dimming control signal in accordance with the detection signal; and
d) comparing the dimming control signal against a triangular wave signal to generate a comparison result that is high when the triangular wave signal is greater than the dimming control signal.

16. The method of claim 15, further comprising:
a) converting the dimming control signal into a dimming signal by a different conversion in accordance with the detection signal; and
b) generating a voltage driving signal for generating a driving current to drive an LED load.

17. The method of claim 16, wherein when the dimming control signal with the type of a certain voltage signal, the detection signal is in a first state, and the dimming control signal is compared against a triangular wave signal to generate a comparison result as the dimming signal.

18. The method of claim 16, wherein when the dimming control signal with the type of a PWM signal, the detection signal is in a second state, the dimming control signal is directly taken or inverted as the dimming signal.

19. The method of claim 15, wherein:
a) when the number of rising or falling edges of the dimming control signal is less than a predetermined number, the dimming control signal is of a certain voltage signal, and the detection signal is in a first state; and
b) when the number of rising or falling edges of the dimming control signal is not less than the predetermined number, the dimming control signal is of a pulse-width modulation (PWM) signal, and the detection signal is in a second state.

* * * * *